US006663301B2

(12) United States Patent
Piccinino, Jr. et al.

(10) Patent No.: US 6,663,301 B2
(45) Date of Patent: Dec. 16, 2003

(54) CHEMICAL DELIVERY SYSTEM FOR USE WITH A PHOTOGRAPHIC PROCESSOR AND METHOD OF OPERATION

(75) Inventors: Ralph L. Piccinino, Jr., Rush, NY (US); Daniel C. Davis, Rush, NY (US); Ronald W. Grant, Calendonia, NY (US)

(73) Assignee: Eastman Kodak Company, Rochester, NY (US)

( * ) Notice: Subject to any disclaimer, the term of this patent is extended or adjusted under 35 U.S.C. 154(b) by 3 days.

(21) Appl. No.: 10/027,432

(22) Filed: Dec. 21, 2001

(65) Prior Publication Data

US 2003/0118342 A1 Jun. 26, 2003

(51) Int. Cl.[7] .................................................. G03B 3/02

(52) U.S. Cl. ........................ 396/571; 396/626; 396/636; 355/27

(58) Field of Search ................................. 396/571, 617, 396/620, 626, 636, 641; 355/27–29, 40, 41, 77; 134/64 P, 64 R, 122 P, 122 R; 430/30, 394, 400

(56) References Cited

U.S. PATENT DOCUMENTS

| | | | | |
|---|---|---|---|---|
| 3,792,651 A | | 2/1974 | Banks | 396/635 |
| 3,986,537 A | | 10/1976 | Wilhere | 141/198 |
| 4,005,463 A | | 1/1977 | Kowalski | 396/634 |
| 4,013,412 A | | 3/1977 | Mukae | |
| 4,178,088 A | | 12/1979 | Harding | 396/635 |
| 4,269,501 A | | 5/1981 | Griffith et al. | 396/635 |
| 4,277,159 A | | 7/1981 | Descotes | 396/635 |
| 4,431,294 A | | 2/1984 | Baker | 396/635 |
| RE34,188 E | | 3/1993 | Kuzyk et al. | |
| 5,349,412 A | | 9/1994 | Miyasaka | 396/626 |
| 6,247,856 B1 | * | 6/2001 | Shibano et al. | 396/565 |
| 6,322,261 B1 | * | 11/2001 | Kuzyk | 396/625 |
| 6,517,261 B1 | * | 2/2003 | Piccinino et al. | 396/571 |

* cited by examiner

*Primary Examiner*—D. Rutledge
(74) *Attorney, Agent, or Firm*—David A. Novais

(57) ABSTRACT

A chemical delivery system and method for use in a photographic processor is disclosed. The chemical delivery system includes a heating assembly that comprises a heating chamber and a level detection sensor. The heating chamber receives a predetermined amount of processing solution from a storage tank based on the level of the level detection sensor, heats the predetermined amount of processing solution and supplies the same to an associated photograph processor.

18 Claims, 8 Drawing Sheets

CHEMICAL DELIVERY SYSTEM FOR USE WITH A PHOTOGRAPHIC PROCESSOR AND METHOD OF OPERATION

CROSS REFERENCE TO RELATED APPLICATIONS

The present application is related to the following pending patent applications, some of which are filed concurrently herewith: U.S. Pat. No. 6,485,202 issued Nov. 26, 2002, entitled PHOTOGRAPHIC PROCESSOR AND METHOD OF OPERATION and U.S. Pat. No. 6,517,261 issued Feb. 11, 2003, entitled A PROCESSING SOLUTION DELIVERY SYSTEM HAVING A SUPPLY TUBE AND LEVEL DETECTION SENSOR UNIT FOR USE WITH A PHOTOGRAPHIC PROCESSOR.

FIELD OF THE INVENTION

The present invention is directed to a chemical or processing solution delivery system, which may be used in a photographic processor.

BACKGROUND OF THE INVENTION

Photographic processors come in a variety of shapes and sizes from large wholesale photographic processors to small micro-labs. As photographic processors become more and more technologically sophisticated, there is a continued need to make the photographic processor as user-friendly and as maintenance-free as possible.

Currently available photographic processors have one or more of the following shortcomings: (1) the film processing time is relatively high; (2) some photographic processor, because of their size, require a large amount of space; (3) some photographic processors may require an unacceptable amount of developing solution due to the design of the processing tank; and (4) some photographic processors generate an unacceptable amount of developing solution waste due to the design of the processing tank.

One component of photographic processors is a chemical or processing solution delivery system, which provides processing fluids for processing a roll of photographic film. Some conventional chemical delivery systems have one or more of the following shortcomings: (1) the chemical delivery time is unacceptably high due to (a) a processing fluid dilution step, (b) undesirably long heating times, (c) low volumetric flow into or out of the processing drum or reactor, or (d) a combination thereof; (2) some chemical delivery systems, because of their size, require a large amount of space; (3) some chemical delivery systems require an external water source to dilute the concentration of the chemicals used in the chemical delivery system; and (4) some chemical delivery systems require a drain for removal of the processing fluids from the processor.

What is needed in the art is a chemical delivery system, which (a) provides exceptional processing speed, and (b) does not require an external water source. What is also needed in the art is a chemical delivery system, which may be used in a variety of photographic processors, and is capable of minimizing (a) the amount of space needed for operation, and (b) the amount of waste generated during the photographic process.

SUMMARY OF THE INVENTION

The present invention addresses some of the difficulties and problems discussed above by the discovery of a novel, chemical or processing solution delivery system for use in a photographic processor. The chemical delivery system provides numerous advantages over conventional chemical delivery systems including, but not limited to, (a) the ability to use "processing strength" chemicals, as oppose to concentrated chemicals, which must be diluted prior to use; (b) improved heating cycles due to a chemical heating chamber design; and (c) the ability to operate without an external water source for dilution of processing chemicals.

Further, the chemical delivery system of the present invention minimizes the amount of time needed to chemically process a roll of film. The chemical delivery system of the present invention is extremely user-friendly and requires very little maintenance.

The chemical delivery system of the present invention comprises one or more of the following components: a chemical storage reservoir, a heating assembly, and a chemical waste reservoir. One or more flow meters may be used, for example, (a) between the chemical storage reservoir and the heating assembly; or (b) between the heating chamber and a processor drum or reactor. A series of pumps and/or suction devices may be used in the chemical delivery system of the present invention to transfer a processing fluid from one location to another location within the system, for example, from a processor drum or reactor to a chemical waste reservoir.

Accordingly, the present invention is directed to a chemical delivery system, which may be used in a photographic processor. The present invention is further directed to a process of delivering chemicals to a photographic processor using the chemical delivery system.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION OF THE INVENTION

The present invention is directed to a chemical delivery system which may be used with a photographic processor.

The chemical delivery system of the present invention comprises one or more components for storing, transporting, and collecting processing fluids or solutions, such as processing fluids or solutions used in a photographic processor. The present invention is further directed to a method of delivering chemicals, fluids or solutions to a processor, such as a photographic processor drum or tank using the chemical delivery system described below. An exemplary chemical delivery system 10 is shown in FIG. 1.

Figure 1:
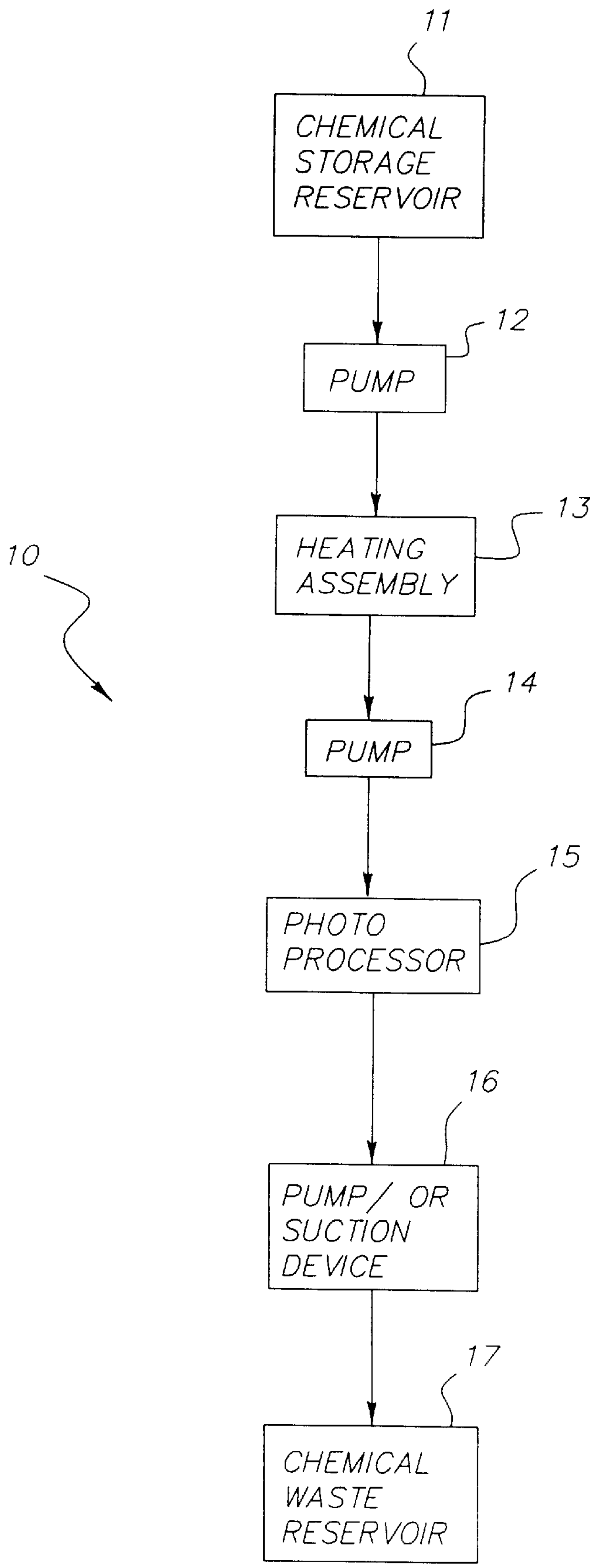
FIG. 1 is a schematic drawing of exemplary components in a chemical delivery system of the present invention.

As shown in FIG. 1, an exemplary chemical delivery system 10 of the present invention comprises a chemical storage reservoir 11, a heating assembly 13, and a chemical waste reservoir 17. The chemical delivery system 10 may also comprise one or more devices for moving a processing fluid from one location to another location within the photographic processor. As shown in FIG. 1, a pump 12 may be used to move processing fluid from chemical storage reservoir 11 to heating assembly 13. An optional pump 14 may be used to move heated fluid from heating assembly 13 to a photographic processor 15 such as a drum or tank. Further, a suction device or pump 16 may be used to remove processing fluid from processor 15 and transport the fluid to chemical waste reservoir 17.

It should be noted that other mechanisms may be used to move processing fluid from one location to another within the chemical delivery system of the present invention. For example, gravimetric force may be used to move processing fluid from heater assembly 13 to processor 15 and/or from processor 15 to chemical waste reservoir 17.

Each of the components of the chemical delivery system of the present invention is described in detail below.

The chemical storage reservoir may comprise four or more separate containers for storing multiple processing fluids. Typically, at least one storage container houses a developing solution, at least one storage container houses a bleach solution, at least one storage container houses a fix solution, and at least one storage container houses a wash solution. Regardless of whether the processing fluid is a developing, bleach, fix, or wash solution, the processing fluid is present within the storage container at a "working strength" concentration. As used herein, the phrase "working strength" is used to describe a processing fluid concentration, which may be used directly from the storage container without dilution with an external fluid, such as water.

Figure 2:
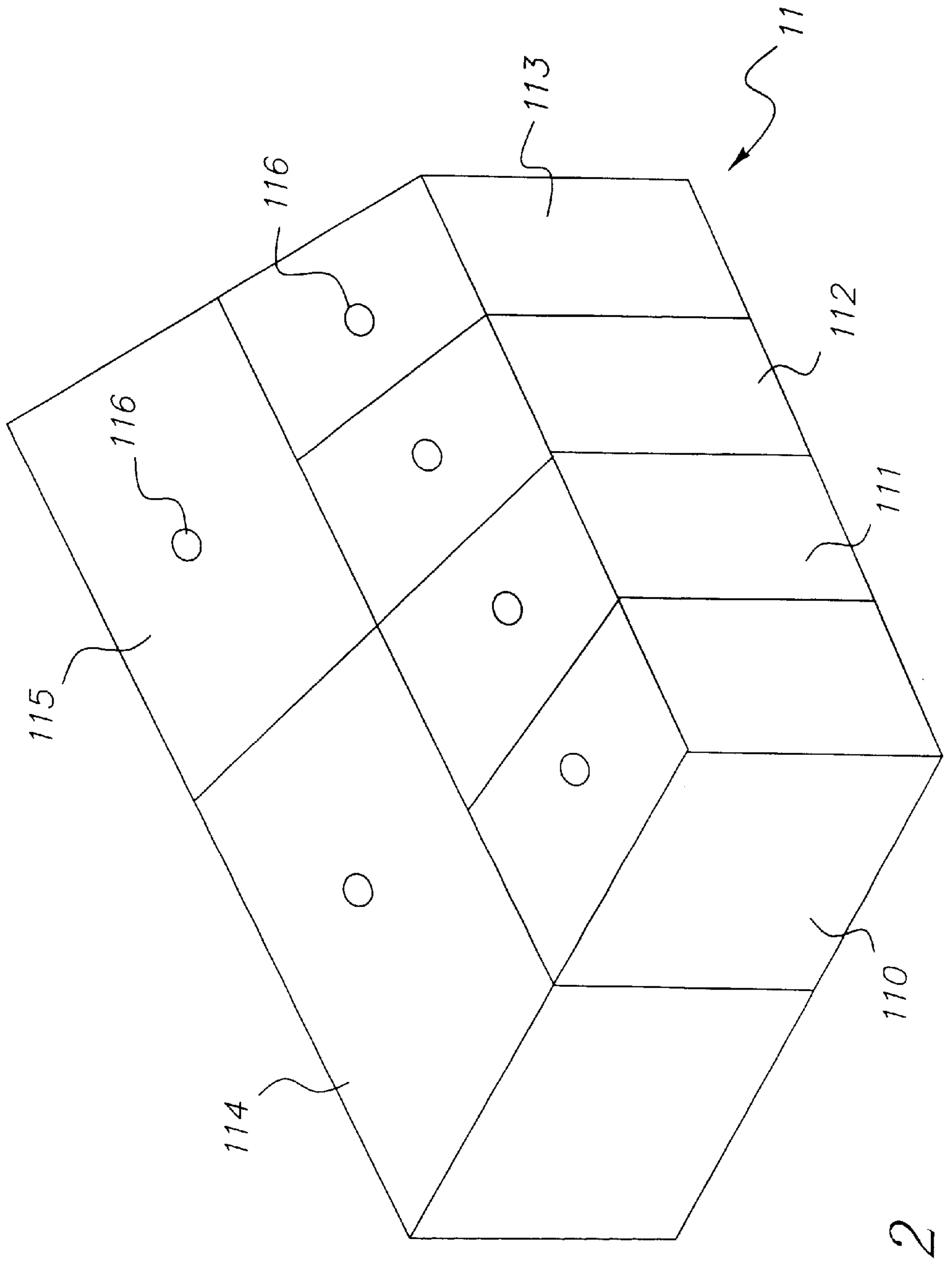
FIG. 2 depicts an exemplary chemical storage reservoir used in the chemical delivery system of the present invention.

An exemplary chemical storage reservoir, which may be used in the chemical delivery system of the present invention, is shown in FIG. 2. As shown in FIG. 2, chemical storage reservoir 11 comprises four chemical storage containers 110 through 113. Chemical storage reservoir 11 can further comprise two additional chemical storage containers 114 and 115 positioned behind or next to containers 110 to 113. Each container 110 through 115 has a container outlet 116 for introducing and/or removing chemicals from the container.

The size, shape configuration and number of containers within the chemical storage reservoir 11 may vary depending on a number of factors including, but not limited to, the desired capacity of the chemical delivery system, and the desired size of the photographic processor. Desirably, the chemical storage reservoir comprises at least four separate chemical storage containers housing a developing solution, a bleach solution, a fix solution, and a wash solution. During a given chemical processing method, a desired volume of each solution (i.e., developing, bleach, fix and wash) is used to process photographic film.

As discussed above, the configuration of the four or more containers in the chemical storage reservoir may be any desirable configuration for a particular volume of space. For example, if the available volume of space is cylindrical, the four or more separate storage containers may have a pie shape, so that the total number of storage containers, when assembled, resembles a cylindrical volume of space.

Each storage container of the chemical storage reservoir may be connected to other components of the chemical delivery system, such as the heating assembly (described below). Processing fluids from the storage containers may be directed to other components of the chemical delivery system via conventional plastic tubing or any other means. In each fluid pathway from a storage container, a flow meter may be used to monitor and control the amount of processing fluid exiting each storage container. Further, a pump, or any other means of moving processing fluid, may be used in each fluid pathway to move processing fluid from a storage container to another location within the chemical delivery system. Desirably, each storage container has a separate fluid pathway and a separate pump, for moving each processing fluid to the other components of the chemical delivery system.

In a further embodiment of the present invention, the chemical storage reservoir rests on a sliding tray, which enables easy removal of the chemical storage reservoir from within a closed space, such as from within a photographic processor, to an open area, such as outside a photographic processor. Such an assembly allows for easy access and ease of maintenance during periodical replacement of one or more storage containers.

The chemical delivery system of the present invention may further comprise a heating assembly, which comprises one or more heating chambers for heating processing fluids prior to introduction into a photographic processor drum or tank. An exemplary heating assembly is shown in FIGS. 3–6.

Figure 4:
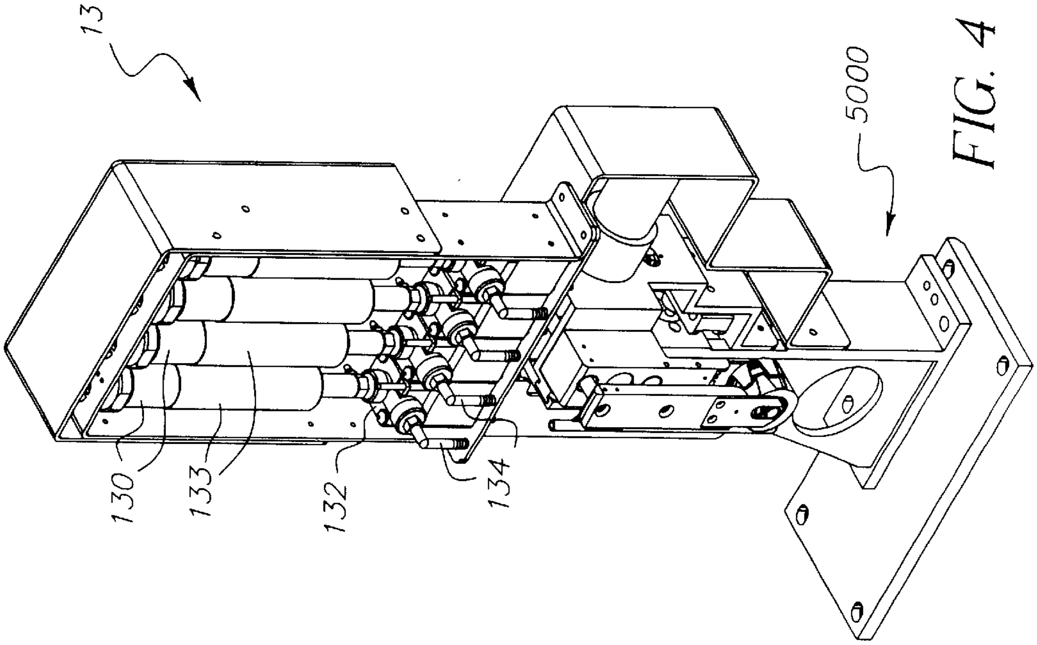
FIG. 4 is a frontal view of the exemplary heating assembly of FIG. 3.
Figure 3:
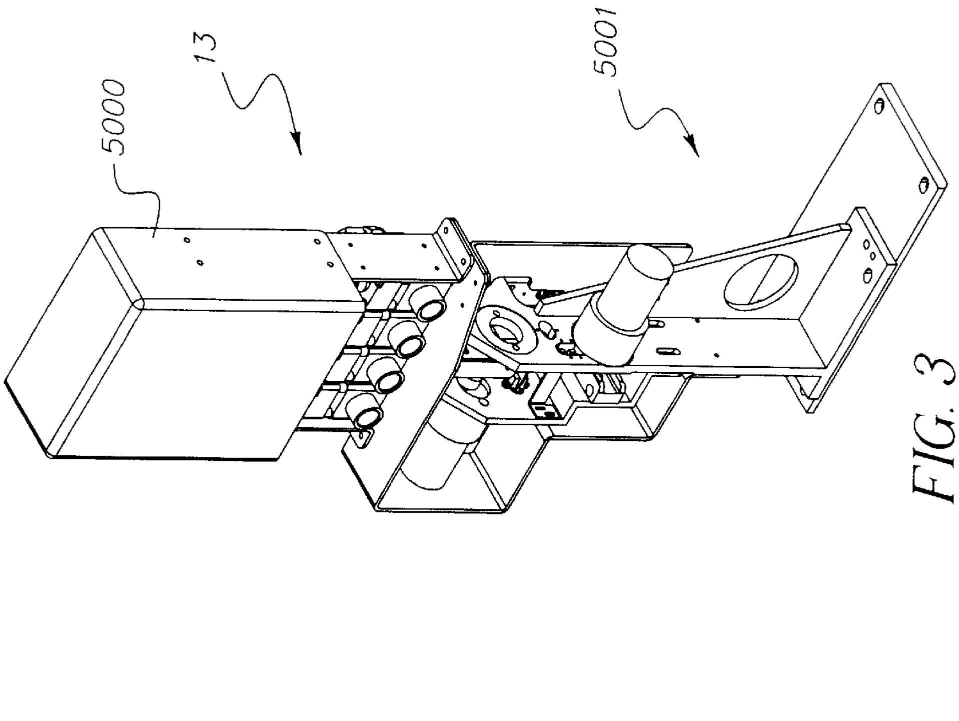
FIG. 3 is a rear view of an exemplary heating assembly for use in the chemical delivery system of the present invention.
Figure 5:
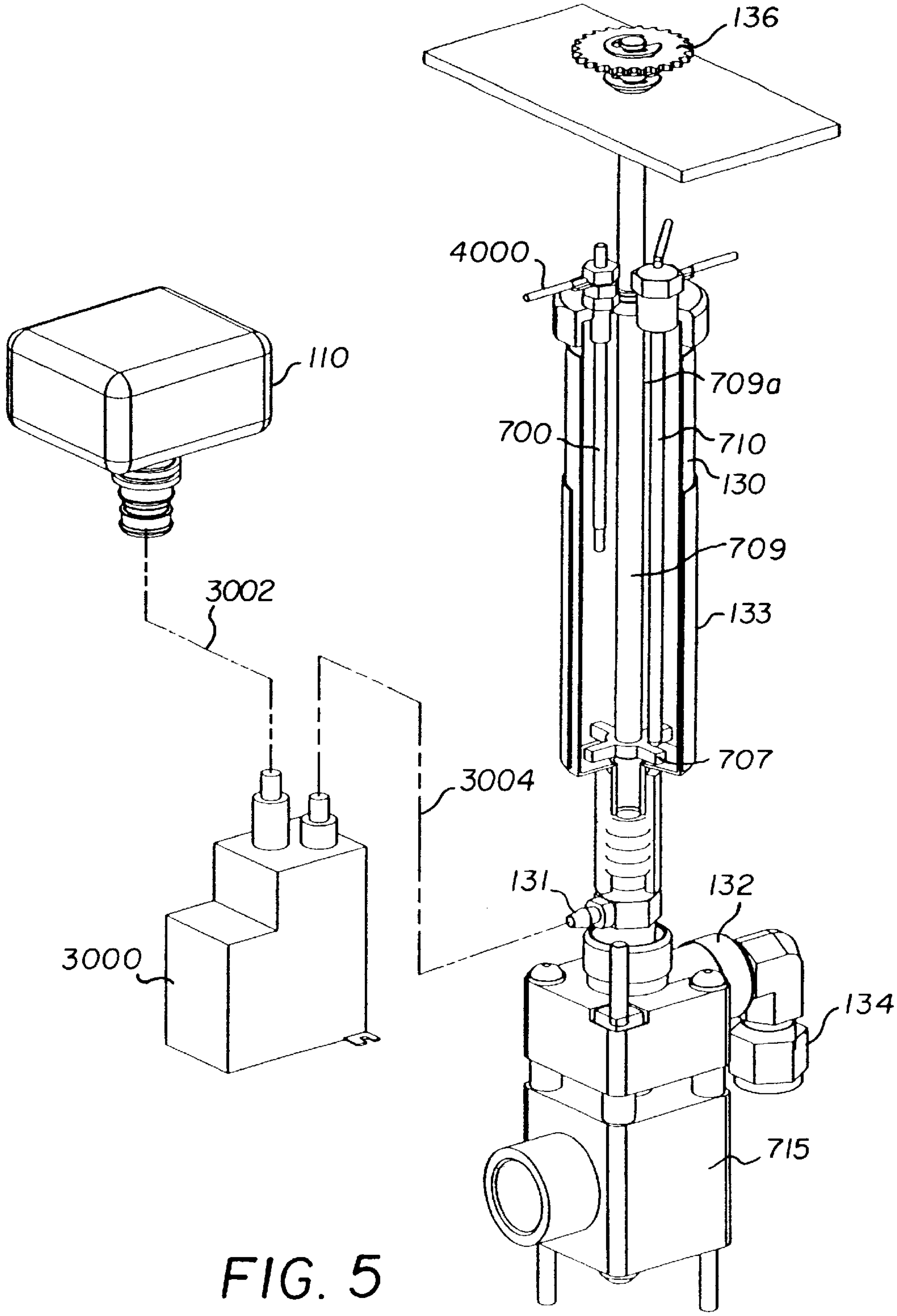
FIG. 5 shows a first embodiment of a heating chamber of the heating assembly in accordance with the present invention.

As shown in FIGS. 3 and 4, heating assembly 13 comprises four separate heating chambers in the form of stainless steel tubes (shown in FIG. 4 as 130). Heating assembly 13 including chambers 130 can be enclosed in a casing 5000 which can be mounted on a stand 5001 for placement at a location adjacent to or in the vicinity of a photographic processor. As shown in FIG. 5, which shows a single heating chamber of heating assembly 13, heating chamber 130 has a heating chamber inlet 131, which receives processing fluid from a chemical storage container (for example, container 110 in FIG. 2) of the chemical storage reservoir 11 described above. Heating chamber 130 is connected to an outlet chamber 132 which is in turn connected to a heating chamber outlet valve 134. As shown in FIG. 4, each heating chamber 130 is connected to a heating chamber outlet valve 134 for discharging heated fluid or solution from heating chamber 130 to an photographic processor. Each heating chamber 130 comprises a heating tube 133 positioned around an outer surface of heating chamber 130 for heating the chamber 130 and its contents.

With reference to FIG. 5, which shows one of heating chambers 130 as an example, a pump 3000 is used to pump solution from container 110 to heating chamber inlet 131, via fluid lines 3002 and 3004. All of the heating chambers 130 include a level detection sensor 700 positioned within chamber 130. Level detection sensor 700 can be in the form of, for example, a metallic or stainless steel tube. The interior of all of the heating chambers 130 further include a stirrer 709 which includes a stirrer vanes 707. Additionally, positioned within each chamber 130 is a temperature sensor or monitor (thermister) 710 which monitors the temperature of the fluid within chamber 130.

Therefore, after processing fluid is pumped into heating chamber inlet 131 as described above, the fluid will enter into heating chamber 130 and rise within heating chamber 130. At this point, heating tube 133 can be activated to heat the processing fluid within heating chamber 130, and at the same time or shortly thereafter, stirrer 709 is rotated so as to mix the heated fluid within heating chamber 130.

In a feature of the present invention, only an appropriate or predetermined amount of processing fluid which is to be supplied to the associated processor is pumped into heating chamber 130. To achieve this feature, level detection sensors 700 in each of heating chambers 130 are positioned at an appropriate height for the specific processing fluid. For example, if more developing solution is required for a specific processing step than bleach solution, the level detection sensor 700 which is in the heating chamber 130 for the developing solution would be positioned at a higher level than the level detection sensor 700 that would be positioned in the heating chamber 130 for bleach solution.

Therefore, as processing solution or fluid fills heating chamber 130, heating chamber 130 is heated by the activation of heating tube 133, and at the same time, or shortly thereafter, the heated solution is stirred or mixed by way of stirrer 709. When the processing solution reaches a height as defined by level detection sensor 700, it is recognized that the appropriate amount of solution is now within heating chamber 130 for the specific processing to be performed. Essentially, the processing solution rising within heating chamber 130 contacts level detection sensor 700 which is connected to a central control circuit through a wire 4000 and thus completes a circuit. This would then provide a signal to a solenoid 715 also connected to the control circuit. At that point, solenoid 715 is activated so as to discharge the heated and stirred processing solution from heating chamber 130 via outlet chamber 132 and outlet valve 134. Solenoid 715 could be a two-way solenoid which has a first position that permits fluid to enter fluid inlet 131 and proceed into heating chamber 130, and a second position which closes inlet 131 while opening chamber 132 and chamber valve 134, so as to permit the supply of heated and mixed processing solution to an associated processor.

Thus, with the system of the present invention, only the actual or predetermined amount of solution that will be used at the specific processing stage is heated. This is due to the fact that the level detection sensor 700 which is set at a level based on the type of solution to be supplied to the processor, will signal when enough solution is within chamber 130. At that point, solenoid 715 opens chamber 132 and chamber valve 134 to deliver the heated and stirred solution to the associated processor. With the arrangement of the present invention, there is no need to heat a large amount of solution stored within, for example, a large storage container.

Chamber 130 further includes a temperature monitor or sensor 710 which monitors and controls the temperature of solution within heating chamber 130. Therefore, the system could be designed to shut down if the temperature of the solution becomes too high. Further, temperature monitor 710 monitors and controls the heating of the processing solution so as to assure that the processing solution is delivered to the processor at the appropriate temperature.

Figure 6:
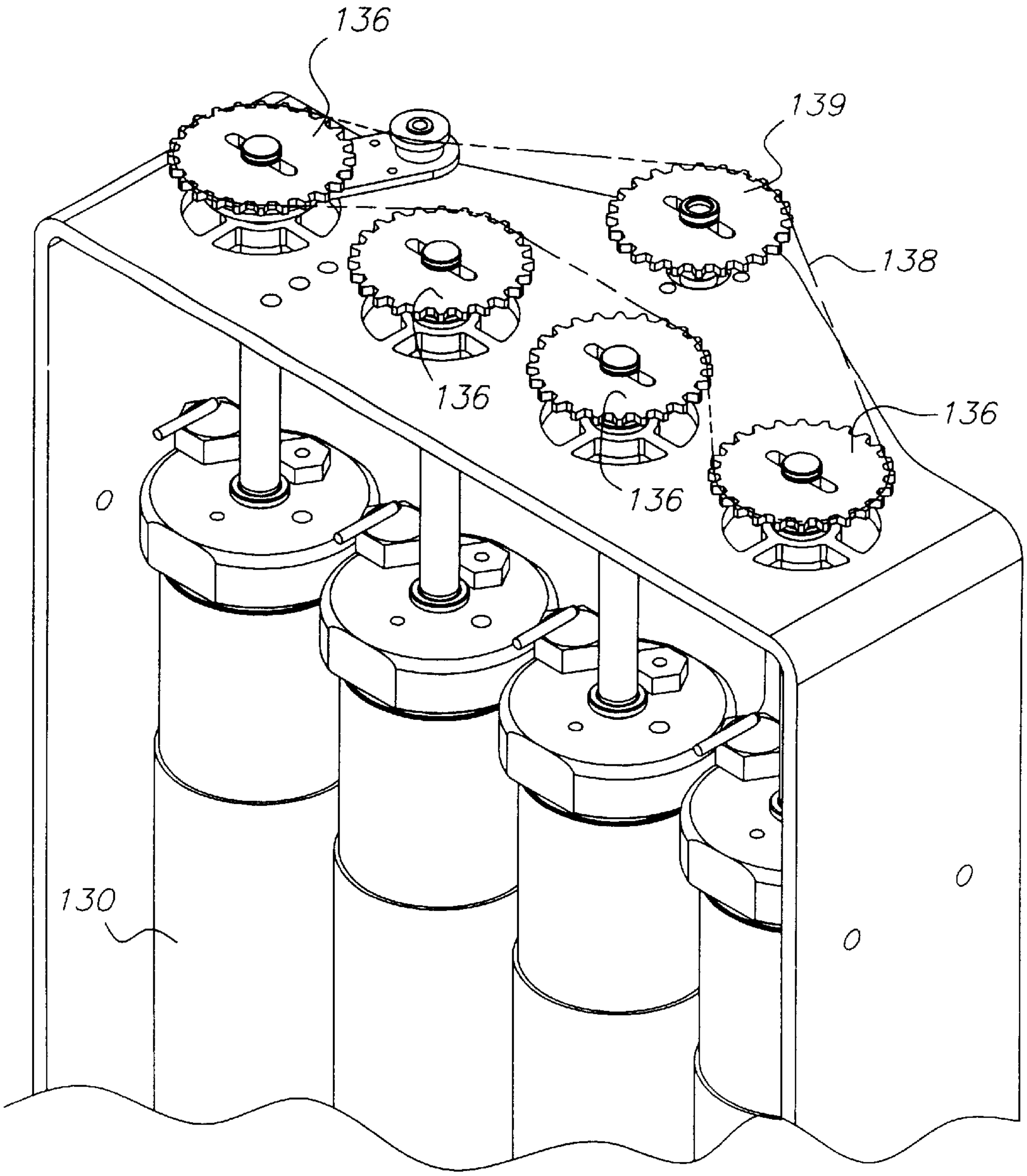
FIG. 6 displays a close-up view of an exemplary driving device for a stirring assembly used in the chemical delivery system of the present invention.

As shown in FIG. 5, stirring mechanism 709 of the present invention comprises a rod 709*a* which extends above heating chamber 130. The rod is connected to a sprocket 136 which when rotated, rotates stirring vanes 707. In the arrangement of the present invention in which, for example, four heating chambers are utilized as shown in FIG. 4, sprockets 136 could be set up as shown in FIG. 6. More specifically, FIG. 6 is a top view of a heating assembly which includes four heating chambers 130. As shown in FIG. 6, stirring mechanism 709 may comprise multiple sprockets 136; multiple stirring rods 709*a*, (a portion which extends into heating chambers 130); a chain 138 which connects the sprockets 136 to one another, and a drive sprocket 139 which is driven by a motor not shown.

Heating tube 133 of heating chamber 130 is preferably heated using electricity, steam or any other conventional method of providing heat. Using temperature monitor 710 and level detecting sensor 700 it can be determined that the desired amount of processing fluid is in chamber 130, and the processing fluid has reached the desired temperature. Thereafter, solenoid 715 can be actuated to open chamber 132 and chamber valve 134 and thus permit the heated and mixed processing fluid to exit from heating chamber 130.

The number of heating chambers 130 in heating assembly 13 may vary depending on a number of factors including, but not limited to, the desired chemical processing time for processing a roll of film, the desire to heat one or more processing fluids simultaneously, and the available space for the heating assembly. Desirably, heating assembly 13 comprises at least four separate heating chambers 130 so that each processing fluid may be heated simultaneously, sequentially or in an overlapping manner.

Each heating chamber 130 may be heated independently from one another, or may be heated and controlled simultaneously with other heating chambers 130. Desirably, each heating chamber is capable of accelerated heating of a given volume of processing fluid up to a known or acceptable temperature or temperatures which are appropriate to achieve the desired processing result. Heating rates and final temperatures may be controlled by a microprocessor or computer, wherein heating rates and final temperatures are programmed into the microprocessor or inputted by an operator for a particular type of film.

Each heating chamber of the heating assembly may feed into another component, such as a photographic processor tank or drum. Heated processing fluids from the heating assembly may be directed to other components of the chemical delivery system via conventional plastic tubing or any other means as described above. The fluid pathway from the heating chamber(s) may converge into a single pathway of tubing prior to reaching another component, such as such as a photographic processor, or may remain as separate fluid pathways to the other component. In each fluid pathway, a flow meter may be used to monitor and control the amount of heated processing fluid exiting each heating chamber. Desirably, each heating chamber has a separate fluid pathway, and optional flow meters and pumps for each fluid pathway to the other components of the chemical delivery system.

The chemical delivery system of the present invention may also comprise a chemical waste reservoir for collecting processing fluids after the fluid has gone through a processing cycle in an associated process. The chemical waste reservoir may have any size and shape, which is compatible with a given chemical delivery system and photographic processor. Desirably, the volume capacity of the chemical waste reservoir is substantially equal to or greater than the total volume capacity of the chemical storage reservoir.

Desirably, the chemical waste reservoir is positioned within or exterior to a photographic processor to allow for easy access to the chemical waste reservoir. Like the chemical storage waste reservoir described above, the chemical waste reservoir may rest on a sliding assembly, which enables the chemical waste reservoir to be moved from a position within a photographic processor to a position outside of a photographic processor.

The chemical delivery system of the present invention may be used in a variety of processing equipment, but has particular utility in a photographic processor. The chemical delivery system of the present invention may be used in a photographic processor capable of processing one or more types of film including, but are not limited to, APS film, 135 mm film. Desirably, the chemical delivery system of the present invention is used in combination with a photographic processor designed to process APS film, 135 mm film, or both APS and 135 mm film. One particularly desirable photographic processor for use with the chemical delivery system of the present invention is disclosed in copending U.S. patent application Ser. No. 10/027,382, entitled "PHOTOGRAPHIC PROCESSOR AND METHOD OF OPERATION" (Docket No. 83416).

The present invention is further directed to a process of delivering processing chemicals to a photographic processor tank or drum using the above-described chemical delivery system. In one embodiment of the present invention, the process comprises (a) transferring one or more processing fluids from a chemical storage reservoir comprising one or more chemical storage containers to a heating assembly comprising one or more heating chambers; (b) heating the one or more processing fluids to a first temperature in the one or more heating chambers; (c) transferring a first heated processing fluid from the one or more heating chambers to a photographic processor; and (d) transferring the first heated processing fluid from the photographic processor reactor to a chemical waste reservoir.

The process of the present invention may be used to deliver one or more processing fluids, such as solutions used in a photographic processor (i.e., developing, bleach, fix, and wash solutions), as well as other types of solutions in processing equipment.

The process of the present invention is capable of heating one or more processing fluids simultaneously or sequentially in an accelerated manner.

Figure 7:
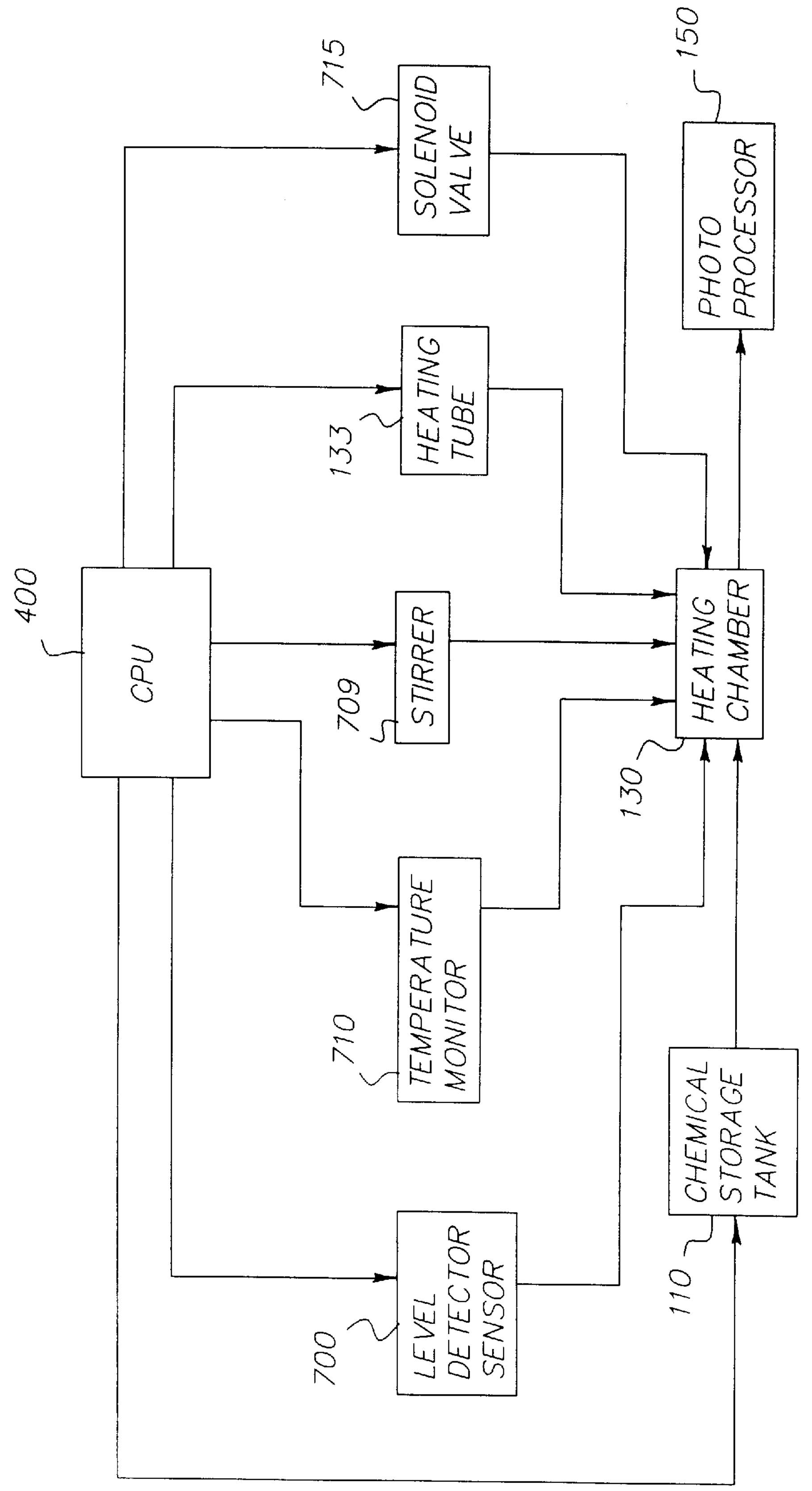
FIG. 7 is a schematic representation of a control arrangement for the chemical delivery system of the present invention.

The process of the present invention with respect to supplying processing solution to the heating chamber and supplying the heated processing solution to a processor could be performed manually, in an automated process controlled by a central processing unit or a combination of the two. FIG. 7 is a schematic illustration showing an example process for controlling the supply of processing solution to a processor. As illustrated in FIG. 7, a computer or control processor (CPU 400) can be used to control a portion or all of the process. In the example of FIG. 7, a single storage tank 110 is shown, however, it is recognized that in the process of the present invention, a different storage tank for each chemical or processing solution could be used. CPU 400 provides a signal to storage tank 110 indicating that a first amount of processing solution is to be supplied to heating chamber 130. As the processing solution is supplied to heating chamber 130, level detection sensor 700 which is operationally associated with CPU 400, detects when the processing solution reaches a predetermined height (volume) and, therefore, would signal that a predetermined volume or the first amount of processing solution which is to be supplied at the specific step of the process is in chamber 130. Further, heating tube 133 also associated with CPU 400, receives instructions to heat the processing solution in the chamber 130, either after chamber 130 is filled, or as chamber 130 is filling. Additionally, solenoid 715 also operationally associated with CPU 400 is in a first position where processing solution is permitted to enter heating chamber 130 and prevented from exiting heating chamber 130. Temperature monitor 710 operationally associated with CPU 400 monitors the temperature of the processing solution that is heated within heating chamber 130 to assure that the processing solution reaches the proper temperature, and also, to prevent the processing solution from being overheated. In the event that the processing solution is overheated, temperature monitor 710 can provide a signal to CPU 400 to shut down the process. Stirrer 709 also receives a signal from CPU 400 to actuate the stirrer, so as to mix the processing solution while it is being heated or after it is heated, and prior to the solution being delivered to an associated processor 150.

After the processing solution reaches the predetermined level as confirmed by level detection sensor 700, and after the desired temperature is reached as confirmed by temperature monitor 710, CPU 400 controls solenoid 715 to open chamber 132 and chamber valve 134, and permit the delivery of the heated and stirred processing solution to processor 150. Thereafter, CPU 400 can control the process described above for the supply of the next processing solution from a further storage container or, can provide for a washing cycle if necessary.

Figures 8A, 8B, 8C:
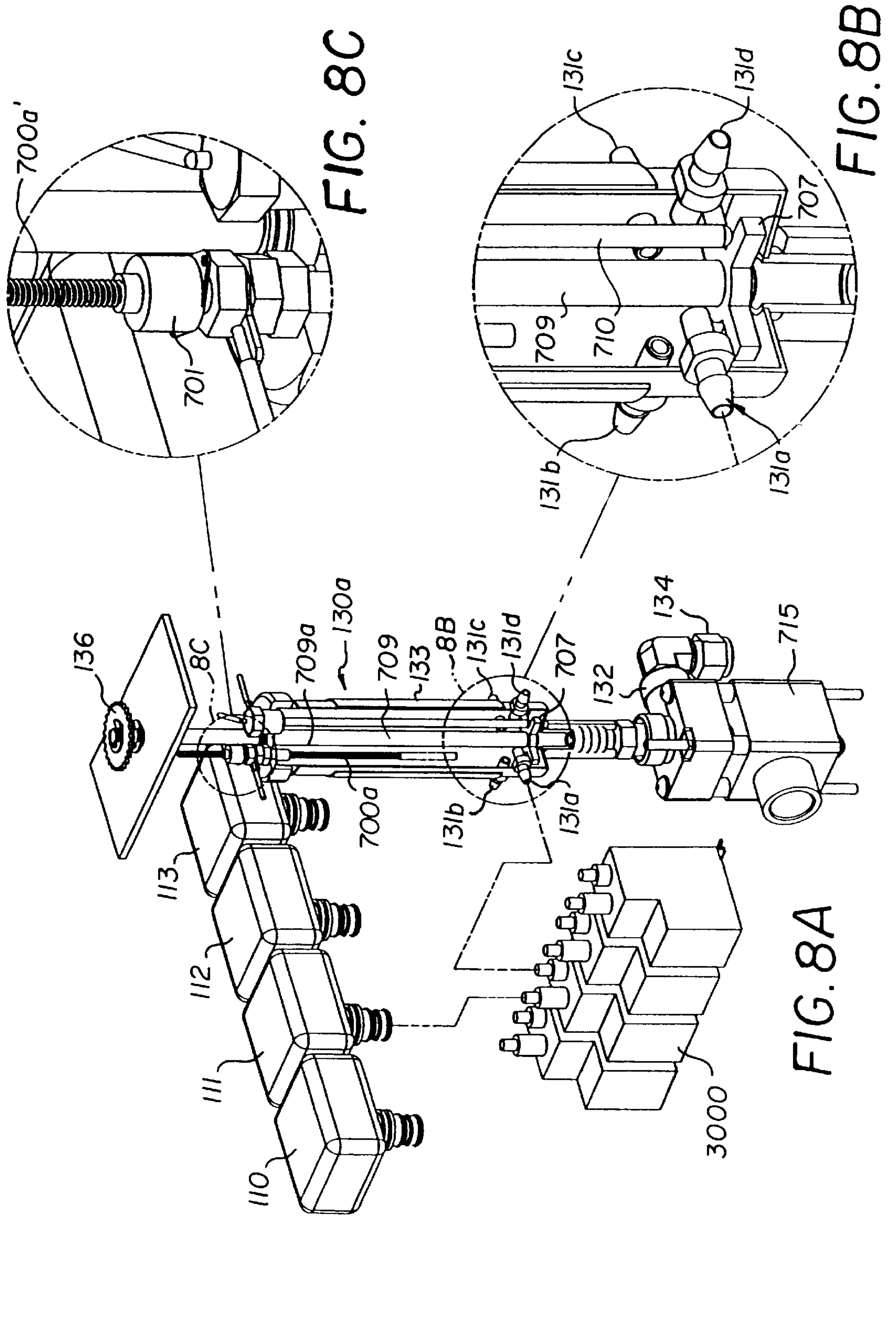
FIGS. 8A–8C show a second embodiment of a heating chamber of the heating assembly in accordance with the present invention; and, FIGS. 9A–9C show a third embodiment of a heating chamber of the heating assembly in accordance with the present invention.

Up to this point, a chemical supply system which utilizes a different tank for each processing solution used, and a different heating chamber which corresponds to the tank with an associated water pump has been described. In a second embodiment of the present invention as illustrated in FIGS. 8A–8C, only a single heating chamber is needed for all the solutions. More specifically, in the embodiment of FIGS. 8A–8C, a single heating chamber 130*a* with an adjustable level detection sensor 700*a* is utilized. In the example, of FIGS. 8A–8C, heating chamber 130*a* includes four valve inlets 131*a*–131*d*, for the introduction of processing solution from each of the storage tanks 110–113. More specifically, each of the inlets 131*a*–131*d* would be dedicated to a specific processing solution storage tank 110–113. In the already described first embodiment of FIGS. 3–5, each of the heating chambers 130 included a level detection sensor 700 that is placed at a specific height within the heating chamber. Thus, if the first heating chamber is for developing solution, the level detection sensor would be set at a first height; while if the second heating chamber is for a bleach solution, the level detection sensor of the second heating chamber would be set at a second height that would be specific to the amount of bleach needed for the specific process, assuming that the amount of bleach solution needed for the process differs from the amount of developing solution.

In the second embodiment of FIG. 8, single heating chamber 130*a* includes level detection sensor 700*a* that is adjustable along an axis of the chamber to multiple positions. Sensor 700*a* of the embodiment of FIGS. 8A–8C could be a threaded rod 700*a'* which is rotated by a motor 701 (FIG. 8C). Therefore, actuation of motor 701 rotates threaded rod 700*a'* to move threaded rod 700*a'* in a direction along an axis of the rod. Of course, the present invention is not limited to the motor and threaded rod arrangement show in FIGS. 8A–8C, and it is recognized that any device, whether manual or automatic, can be used to linearly drive sensor 700*a*. Therefore, when a first processing solution is supplied to heating chamber 130*a* through first inlet valve

131*a,* level detection sensor 700*a* would be placed at a first position and the heating chamber would operate as described, for example, in FIG. 7, with respect to heating the processing solution, stirring the processing solution and monitoring the temperature of the processing solution. When the temperature of the processing solution as measured by temperature monitor 710 reaches a predetermined or desired value, and level detection sensor 700*a* senses that the predetermined amount of processing solution has been received within processing chamber 130*a,* the heated and mixed processing solution is supplied to the associated processor as described with reference to the first embodiment.

Thereafter, and based on the type of solution used, a wash cycle can be used to wash out the first solution prior to the introduction of the second solution; or based on the type of solution and the reactivity between the first and second solutions, a second solution is supplied via a second valve 131*b* into heating chamber 130*a.* When the second solution is supplied, level detection sensor 700*a* would be moved (by actuating motor 701) to a second position depending on the amount of second solution that is required for the processor (assuming that the amount of second solution varies from the amount of first solution). The same procedure as described above with respect to the first processing solution would thereafter be performed for the second solution. Further, the third and fourth processing solutions would be supplied via the third and fourth valves 131*c,* 131*d,* and level detection sensor 700*a* would be positioned in third and fourth positions, in accordance with the amount of third and fourth processing solutions that are necessary for the process. Again, as described, each of the processing solutions would go through the stirring and heating steps as discussed above.

Therefore, in the embodiment of FIGS. 8A–8C, a single heating chamber 130*a* is utilized. The single heating chamber includes an adjustable level detection sensor 700*a* which is movable along a direction which is parallel to an axis of chamber 130*a,* and can be positioned at multiple positions. Each of the positions corresponds to a predetermined amount of processing solution that is desired to be heated and supplied to an associated processor. Single heating chamber 130*a* includes at least two and preferably four inlets for supplying the processing solutions to the heating chamber. In the embodiment of FIGS. 8A–8C, the processing solutions would thus be sequentially heated, stirred and supplied to the associated processor. On the other hand, in the first embodiment of FIG. 5, some of the steps such as the heating of processing solutions could take place simultaneously, since there are multiple heating chambers as opposed to the single heating chamber of FIGS. 8A–8C. Of course, the present invention can be practiced by utilizing a combination of the first embodiment of FIG. 5 and the second embodiment of FIGS. 8A–8C. For example, the present invention can utilize heating chambers 130 as illustrated in FIG. 5 to handle processing solutions that preferably should not be mixed in a single heating chamber, and utilize the heating chambers 130*a* as illustrated in FIGS. 8A–8C, to handle processing solutions which are less reactive with each other, and thus could be introduced into the same heating chamber.

Figures 9A, 9B, 9C:
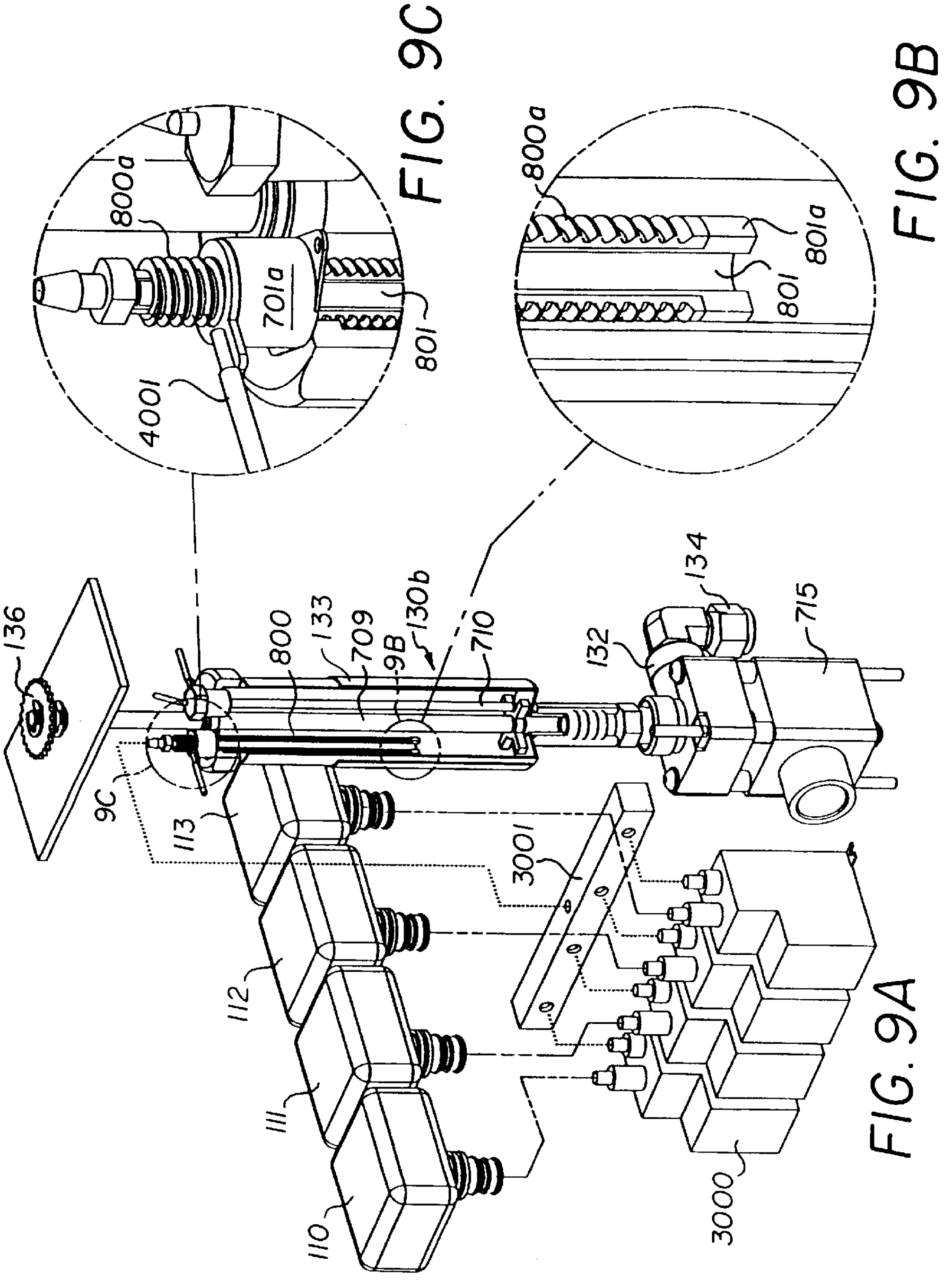

FIGS. 9A–9C illustrate a third embodiment of the chemical supply delivery system of the present invention. In the embodiment of FIGS. 9A–9C, a heating chamber 130*b* includes a member 800 that is both a supply tube for supplying processing solution into the heating chamber 130*b* and a level detection sensor for detecting the level of processing solution in heating chamber 130*b.* Therefore, in the embodiment of FIGS. 9A–9C, heating chamber 130*b* includes a heating tube 133 and a temperature monitor 701 like the first and second embodiments. Heating chamber 130*b* of FIGS. 9A–9C, further includes a stirrer 709 as well as a mechanism for rotating the stirrer including sprocket 136 in the same manner as the first and second embodiment.

In the embodiment of FIGS. 9A–9C, rather than having a single valve (first embodiment) or separate valves (second embodiment) for the input of processing solution into the heating chamber, member 800 acts as both a level detection sensor and a supply tube. Therefore, heating chamber 130*b* does not include both an input valve or valves and a level detection sensor as in the first and second embodiments. Rather, heating chamber 130*b* includes member 800 which functions as both an input member for the introduction of solution into chamber 130*b* and as a level detection sensor.

During use of the embodiment of FIGS. 9A–9C, and utilizing one of storage tanks 110–113 as an example, solution is supplied via pump 3000 to a manifold 3001. Manifold 3001 provides a path for the solution from pump 3000 to heating chamber 130*b.* More specifically, manifold 3001 can be a known manifold which includes four inputs for each of the four storage tanks 110–113, and an output for supplying the solution to heating chamber 130*b.* The solution and preferably, a predetermined amount of processing solution is thereafter supplied to heating chamber 130*b* via member 800 which acts both as a supply tube and as a level detection sensor. More specifically shown as in FIGS. 9B and 9C, member 800 defines a tubular member which comprises an exterior in the form of a metallic or stainless steel threaded rod 800*a* which extends above heating chamber 130*b* (FIG. 9C). A wire 4001 is attached to the top of threaded rod 800*a.* An interior of threaded rod 800*a* defines a plastic sleeve 801 which has a portion 801*a* that extends below threaded rod 800*a.* Therefore, as solution is introduced into heating chamber 130*b* through member 800, it will travel within plastic sleeve 801 and will not contact the metallic threaded rod. This will prevent the occurrence of any false readings due to contact between threaded rod 800*a* and the solution. Since plastic sleeve 801 has a portion 801*a* that extends below threaded rod 800*a,* exiting solution will also not contact threaded rod 800*a* to prevent false readings. This is important since threaded rod 800*a* acts as a level detection sensor in the same manner as the level detection sensor of the first and second embodiments. That is, as processing solution fills heating chamber 130*b,* threaded rod 800*a* which acts as a level detection sensor will detect when a predetermined amount of solution is in heating chamber 130*b.* As the solution rises in heating chamber 130*b,* it will pass plastic portion 801*a* and contact threaded rod 800*a.* This completes a circuit via wire 4001 to signal that a predetermined amount of solution is in chamber 130*b.* Solenoid 715 just as in the first and second embodiments, is controlled to supply the heated processing solution to the processor. As in the first and second embodiments, prior to being supplied to the processor, the heated solution is preferably also stirred by using stirring mechanism 709. Like the second embodiment, member 800 can also be adjustable so as to provide for distinct predetermined amounts of processing solution based on the type of solution being supplied to the heating chamber and the type of processing to be performed. Like the second embodiment, linear movement of member 800 could be achieved through the cooperation of threaded rod 800*a* and motor 701*a* (FIG. 9C).

The invention has been described in detail with particular reference to certain preferred embodiments thereof, but it will be understood that variations and modifications can be effected within the spirit and scope of the invention.

What is claimed is:

1. A chemical delivery system for a photographic processor comprising:

a chemical storage reservoir comprising at least two storage containers for housing a processing fluid therein, wherein the processing fluid has a working strength concentration;

a heating assembly comprising a heating chamber, said heating chamber being fluidly connected to said storage containers and being adapted to receive a predetermined amount of said processing fluid from said storage containers and heat said predetermined amount of processing fluid while in said heating chamber; and a stirring mechanism for stirring the processing fluid within the heating chamber.

2. The chemical delivery system of claim 1, comprising four or more of said storage containers, each of said storage containers comprising a developing solution, a bleach solution, a fix solution, and a wash solution.

3. The chemical delivery system of claim 1, further comprising a pump for pumping the processing fluid from the storage container to the heating chamber.

4. The chemical delivery system of claim 2, wherein the heating assembly comprises at least four separate heating chambers, each of said heating chambers being fluidly associated with one of said four or more storage containers.

5. The chemical delivery system of claim 1, wherein said heating assembly further comprises a level detection sensor, said level detection sensor extending into said heating chamber to a detecting position which corresponds to said predetermined amount of processing fluid which is to be received in said heating chamber, such that said predetermined amount of processing fluid is heated and delivered to an associated photographic processor.

6. A chemical delivery system for a photographic processor comprising:

a chemical storage reservoir comprising at least one storage container for housing a processing fluid therein, wherein the processing fluid has a working strength concentration;

a heating assembly comprising a heating chamber, said heating chamber being fluidly connected to said storage container and being adapted to receive a predetermined amount of said processing fluid from said storage container and heat said predetermined amount of processing fluid while in said heating chamber; and a stirring mechanism for stirring the processing fluid within the heating chamber;

wherein the heating assembly comprises a single heating chamber having at least two solution inlets.

7. The chemical delivery system of claim 6, further comprising a level detection sensor that extends into said heating chamber, said level detection sensor being linearly movable to multiple positions based on a type of solution being supplied to the heating chamber.

8. The chemical delivery system of claim 1, wherein said heating assembly further comprising a temperature sensor to monitor and control the temperature of the processing fluid in said heating chamber.

9. A chemical delivery system for a photographic processor comprising:

a chemical storage reservoir comprising at least one storage container for housing a processing fluid therein, wherein the processing fluid has a working strength concentration;

a heating assembly comprising a heating chamber, said heating chamber being fluidly connected to said storage container and being adapted to receive a predetermined amount of said processing fluid from said storage container and heat said predetermined amount of processing fluid while in said heating chamber; and a stirring mechanism for stirring the processing fluid within the heating chamber;

wherein said heating assembly further comprises a solenoid valve having a first position which permits a supply of said predetermined amount of processing fluid from said storage container to said heating chamber, and a second position which permits a supply of the heated predetermined amount of processing fluid from said heating chamber to said associated photographic processor.

10. A process of delivering processing solution to a photographic processor, said process comprising the step of:

(a) transferring a predetermined amount of at least one processing solution from a chemical storage reservoir comprising at least two chemical storage containers to a heating assembly comprising at least one heating chamber;

(b) heating the predetermined amount of processing solution in the at least one heating chamber; and (c) transferring the heated predetermined amount of processing solution from the at least one heating chamber to an associated photographic processor.

11. The process of claim 10 wherein the at least one processing solution comprises a developing solution, a bleach solution, a fix solution, a wash solution, or a combination thereof.

12. The process of claim 10, wherein the heating assembly comprises at least four of said heating chambers and the chemical storage reservoir comprises at least four of said storage containers.

13. The process of claim 10, further comprising the step of stirring the predetermined amount of processing solution in said heating chamber.

14. The process according to claim 10, further comprising the step of monitoring and controlling a temperature of the processing solution in said heating chamber.

15. The process according to claim 10, further comprising the step of positioning a level detection sensor in said heating chamber at a position which corresponds to said predetermined amount of processing solution.

16. A process of delivering processing solution to a photographic processor, said process comprising the step of:

(a) transferring a predetermined amount of at least one processing solution from a chemical storage reservoir comprising at least one chemical storage container to a heating assembly comprising at least one heating chamber;

(b) heating the predetermined amount of processing solution in the at least one heating chamber; and (c) transferring the heated predetermined amount of processing solution from the heating chamber to an associated photographic processor;

wherein the heating assembly comprises a single heating chamber having at least two solution inlets.

17. The process according to claim 16, further comprising a movable level detection sensor that is movable to multiple positions within said heating chamber.

18. A chemical delivery system for a photographic processor comprising:

a chemical storage reservoir comprising at least one storage container for housing a processing fluid therein, wherein the processing fluid has a working strength concentration; and a heating assembly comprising a heating chamber, said heating chamber being fluidly connected to said storage container and being adapted to receive a predetermined amount of said processing fluid from said storage container and heat said predetermined amount of processing fluid while in said heating chamber;

wherein said heating assembly further comprises a valve having a first position which permits a supply of said predetermined amount of processing fluid from said storage container to said heating chamber, and a second position which permits a supply of the heated predetermined amount of processing fluid from said heating chamber to an associated photographic processor.

* * * * *